United States Patent [19]

Georgopoulos et al.

[11] Patent Number: 4,855,195
[45] Date of Patent: Aug. 8, 1989

[54] ELECTROCHEMICAL CELL WITH INTERNAL CIRCUIT INTERRUPTER

[75] Inventors: Philip Georgopoulos, Lakewood; John Langkau, Rocky River, both of Ohio

[73] Assignee: Eveready Battery Company, Inc., St. Louis, Mo.

[21] Appl. No.: 217,502

[22] Filed: Jul. 11, 1988

[51] Int. Cl.⁴ .......................................... H01M 10/50
[52] U.S. Cl. ........................................ 429/54; 429/62; 429/7
[58] Field of Search ........................ 429/7, 61, 62, 54

[56] References Cited

U.S. PATENT DOCUMENTS

| | | | |
|---|---|---|---|
| 4,035,552 | 7/1977 | Epstein | 429/58 |
| 4,507,368 | 3/1985 | Hashimoto | 429/62 |
| 4,514,620 | 4/1985 | Cheng et al. | 219/553 |
| 4,529,675 | 7/1985 | Sugalski | 429/94 |
| 4,545,926 | 10/1985 | Fouts, Jr. et al. | 252/511 |

FOREIGN PATENT DOCUMENTS 74257 4/1984 Japan .
191273 10/1984 Japan .
203376 11/1984 Japan .

OTHER PUBLICATIONS

Chemical Week, Feb. 12, 1988, p. 26.
Raychem Corporation, PolySwitch ® Products Brochures.
Machine Design, Oct. 25, 1979, pp. 113–117.
30th Power Sources Symposium, Jun. 1982, pp. 130–133.

Primary Examiner—Donald L. Walton
Attorney, Agent, or Firm—Virgil B. Hill

[57] ABSTRACT

Electrochemical cells employ a current collector-safety switch member comprised of a shape memory alloy in the electric circuit in the cell. The collector-safety switch member has a base portion and a plurality of legs extended therefrom and when the internal temperature of the cell rises, the legs of the collector-safety switch member are retracted to thereby disconnect the electrical circuit in the cell. These cells can also be comprised of a resettable thermal switch for inhibiting the flow of current in the cell at a temperature below the disconnect temperature of the current collector-safety switch member.

29 Claims, 3 Drawing Sheets

ELECTROCHEMICAL CELL WITH INTERNAL CIRCUIT INTERRUPTER

This invention relates to electrochemical cells having internal safety switch means for interrupting the electrical circuit.

BACKGROUND OF THE INVENTION

Under abuse conditions, high energy density electrochemical cells can leak or rupture which can cause damage to the device employing the cell or to people using the device. Examples of abuse conditions for a cell are abuse charging of the cell, forces discharging and external shorting. Such conditions cause the internal temperature of the cell to rise and a corresponding increase in pressure. Although such cells typically employ a venting mechanism wherein the electrolyte is expelled, the electrolyte can itself cause damage. Additionally, in cells which employ lithium as an anode material, if internal cell temperatures reach above 180° C., the lithium can melt and result in a fire. Therefore, safety devices other than venting means which will disconnect the electrical circuit under abuse conditions are desirable. If the circuit can be disconnected, the rise in the cell's internal temperature as a result of the abuse conditions can be terminated.

One method of interrupting the flow of electrical current in the cell when the internal temperature of the cell rises is to employ a PolySwitch disc, tradename of Raychem Corp., in the cell. Such a disc is a resettable device which, when a threshold temperature is reached, will inhibit the flow of electrical current in the cell. When the temperature is lowered, the disc will allow the normal available current in the electrical circuit to be restored. Unfortunately, these devices are not suitable for all applications. For example, when the PolySwitch disc is designed to function at low temperatures, the disc may have a low breakdown voltage. Once the breakdown voltage is reached, the disc no longer inhibits the current flow. Therefore, if cells containing these discs are used in a multicell device, and abuse conditions are experienced, the breakdown voltage would be reached and the PolySwitch disc would not inhibit the current flow.

In Japanese Patent Publication No. 59-191273, a memory alloy terminal lead is employed in a lithium/thionyl chloride cell. When the internal temperature of the cell rises, the alloy lead wire folds down to break the electrical circuit. Forming a disconnect member of this single lead wire is undesirable, because the member must be trained to fold down, which requires great expense and time. Also, the single strip can require a relatively large amount of cell space. This is undesirable because all of the available cell space does not then contain active cell components.

In U.S. Pat. No. 4,035,552, a bimetallic strip is disposed in the space between the cell cover and cell casing and functions as a thermal and pressure responsive switch. Because the switch is employed in the space between the cover and case, this switch also unfortunately occupies a relatively large amount of cell space.

In view of the disadvantages of known methods, it would be desirable to have an electrochemical cell which has safety-switch means which will work reliably under substantially all abuse conditions.

Also it will be desirable to have such a means which would not take up an undesirable amount of cell space.

SUMMARY OF THE INVENTION

This invention is an electrochemical cell comprising an electrode assembly containing a positive and a negative electrode contained in a cell housing. The housing contains a means for providing a terminal for one of the electrodes. The cell also comprises a cover assembly containing a means for providing a terminal opposite the terminal of the housing to thereby establish an electrical circuit in the cell. A current collector member is disposed in the circuit and is in physical contact with one of the electrodes. The collector is comprised of a shape memory alloy, and has a base portion and a plurality of legs extending from the base portion and provides a means for disconnecting the electrical circuit in the cell when the internal temperature of the cell rises.

In another aspect, the invention is an electrochemical cell comprising a spirally wound electrode assembly containing a positive and a negative electrode. This assembly is contained in a conductive cell housing which is closed at one end and open at the other end. The closed end is in electrical contact with one of the electrodes so that the housing is adapted to be one of the cell terminals. A cover assembly is disposed over the open end of the housing and comprises a seal-vent assembly. The seal-vent assembly contains a venting well providing means for venting the cell. The cover assembly also has means for providing a terminal for the electrode opposite the electrode in contact with the housing to thereby establish an electrical circuit in the cell. A current collector member is disposed in the electrical circuit of the cell in physical contact with one of the electrodes and in electrical contact with the terminal. The current collector member is comprised of a shape member alloy, and has a base portion, a plurality of contact legs extending away from the base portion, and a means for attaching the collector to the venting well. The current collector provides a means for disconnecting the electrical circuit in the cell when the internal temperature of the cell rises.

In yet another aspect, this invention is an electrochemical cell comprising an electrode assembly of a positive and a negative electrode, and opposing terminals connected to the electrodes to provide an electrical circuit; and a current collector and resettable thermal switch disposed in the circuit. The current collector is comprised of a shape memory alloy and provides a means for disconnecting the electrical circuit in the cell when the internal temperature of the cell rises. The resettable thermal switch provides a means for inhibiting the current flow in the electrical circuit at a temperature below the disconnection temperature of the current collector.

The electrochemical cells of this invention employ a current collector member performing two functions. The first function is collecting the current from an electrode and transferring it to the terminal. The second is a safety function wherein the electrical contact between the electrode and terminal is broken when the internal temperature of the cell rises. These current collectors will be referred to as current collector-safety switch members. Because the safety function is provided within the same member as the current collector, the safety switch takes up little useable cell space so that the available space is used for the cell's active components. The cells of this invention which employ the current collector-safety switch in conjunction with the resettable thermal switch have increased reliability compared to cells with only the resettable thermal switch.

DETAILED DESCRIPTION OF THE INVENTION

Figure 1:
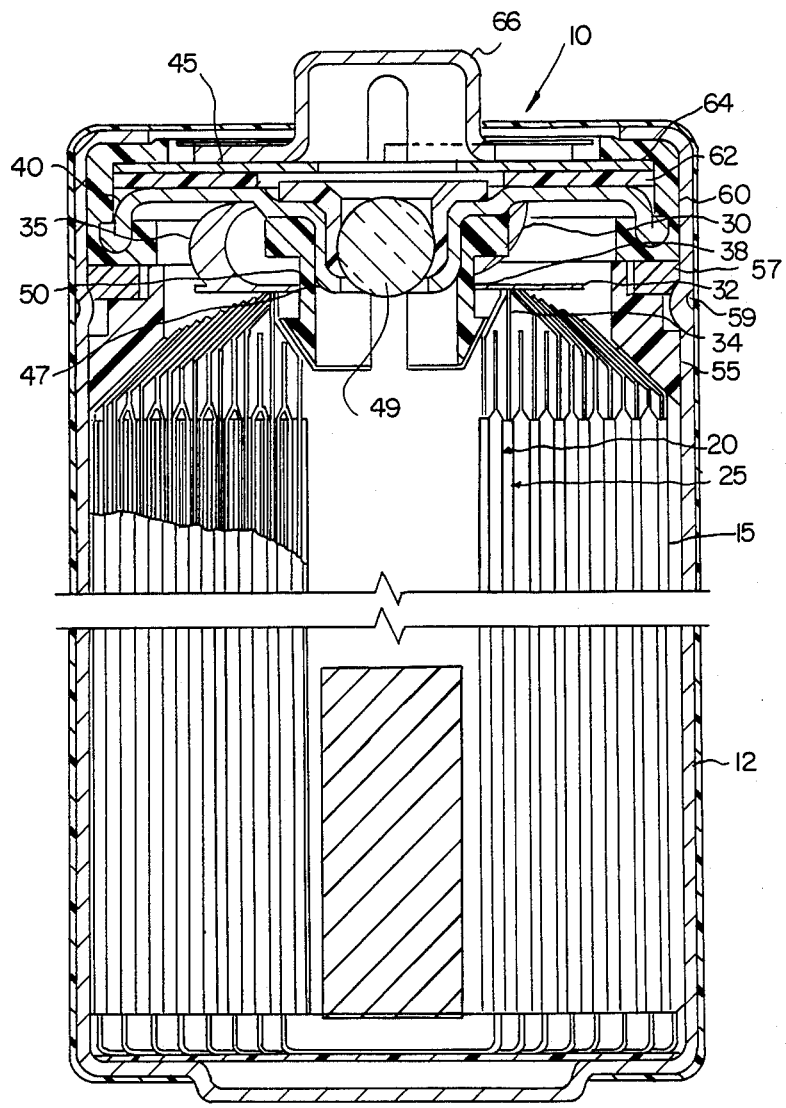
FIG. 1 depicts an electrochemical cell of this invention having a spirally wound electrode assembly and employing the current collector-safety switch member and the resettable thermal switch.

The current collector-safety switch members used in this invention are comprised of a shape-memory alloy. Such alloys are materials which can be formed into desired shapes at room temperature, and when heated, return to their original shape or a formed shape different from the first desired shape. The alloys can be resettable or nonresettable. As employed in this invention, the most preferred materials return to their original shape upon heating and retain that shape upon cooling.

Examples of alloys which exhibit shape memory characteristics are nickel-titanium alloys, copper-zinc-aluminum alloys, and aluminum-copper-silicon alloys. Most preferred for use in this invention are nickel-titanium alloys.

The current collector-safety switch members used in this invention have a base portion with a plurality of legs extending away from it. Preferably, the base portion is disc-shaped and further comprises an orifice in the central area of the disc-shaped base portion. This orifice is preferred example of a means for attaching the current collector-safety switch to other internal cell components. Advantageously, there are three legs extending from the disc-shaped base portion. The three legs are useful to evenly collect and transport the current through the cell circuit. The legs are formed by cutting slits in the base portion and then pushing the legs into the extended position. Therefore, the original position of the current collector-safety switch has the legs flush with the plane of the base portion. Although it is preferred that upon heating, the legs would return to the flush position, the current collector-safety switch is suitable if the legs move sufficiently to disconnect the electrical circuit in the cell. In its most preferred embodiment, the current collector safety switch is a spring member which provides a means for establishing spring bias contact between the electrode and its terminal.

The current collector-safety switch member preferably disconnects the electrical circuit at a temperature below the temperature at which the components of the cell melt or below the temperature at which the internal pressure of the cell becomes large enough to rupture the cell container. If a vent means is employed, the member preferably disconnects the electrical circuit below the venting temperature of the electrochemical cell. This temperature can vary according to cell systems. For cell systems which employ lithium as the anode, the current collector-safety switch preferably disconnects the electrical circuit below the temperature at which the lithium will melt. Most preferably, the disconnect temperature of the current collector-safety switch is between about 85° C. and about 95° C.

In the aspect of this invention wherein both the current collector-safety switch and a resettable thermal switch are employed, it is advantageous that the resettable thermal switch will activate prior to the disconnect temperature of the current collector-safety switch. The preferred resettable switch is a positive thermal coefficient (PTC) resistance device. When the activation temperature of the PTC switch is reached, high resistance results in the device which substantially reduces the current flow. Once the temperature is lowered, the resistance in the switch is reduced and the current flow is restored. Such a resistance device is advantageously employed in flash type uses for an electrochemical cell. Such uses can create an intense and quick peak temperature, which could activate the current collector-safety switch. Therefore, the resettable thermal switch preferably substantially reduces the current flow to avoid reaching the disconnection temperature of the current collector-safety switch.

Examples of suitable resettable PTC switches are are available from Raychem Corporation under the tradename PolySwitch. Such devices are shown in FIG. 1 at number 62.

Any combination of positive and negative electrodes suitable to provide an electrical circuit in the cell can be used in the cells of this invention. Examples of suitable combinations are a stacked assembly, plate assembly, and spirally wound assembly.

The electrode assembly used in the cells of this invention is preferably a spirally wound electrode assembly. Typically, such an assembly has a negative electrode strip comprising an anode material and a positive electrode strip comprising a cathode material separated by a separator strip. Useful anode materials are consumable metals, such as aluminum, zinc, the alkali metals, alkaline earth metals, and alloys of alkali metals and alkaline earth metals. Preferred anode materials for nonaqueous electrolyte systems include aluminum, lithium, sodium, and calcium. Preferably, the anode material for such systems is lithium because it is ductile soft metal and possesses the highest energy-to-weight ratio of the group of suitable anode metals. Lithium can be utilized as a strip or can be applied to a suitable carrier. After being formed into the strip, the electrode will typically have an anode collector portion extending on one edge of the strip.

Suitable active cathode materials are electrochemically reducible materials. Such materials include iron sulfides such as $FeS_2$ and $FeS$, manganese oxides such as $MnO_2$, $CF_x$, $V_2O_5$, $WO_3$, $MoO_3$, $MoS_2$, lead oxides, cobalt oxides, copper oxides, copper sulfides, $In_2O_3$, $NiS$, $Ag_2CrO_4$, $Ag_3PO_4$, $TiS_2$, transition metal polysulfides, and mixtures thereof. By 'active cathode' is meant the material being reduced in the electrochemical reaction. The active cathode material is formed into the positive electrode by mixing the active cathode material with an amount of a suitable conductive material such as carbon and an amount of a suitable binder. The mixture can then be formed into a strip material or pressed, impregnated or coated onto a suitable carrier such as foil or expanded metal. After being formed into the strip, the electrode will typically have a cathode collector portion extending on one edge of the strip.

Separator materials useful in this invention are materials which are electrically nonconductive but ionically conductive and are porous to allow the electrolyte to contact both electrodes. Examples of suitable separator materials are paper, polypropylene and polyethylene.

The spirally wound electrode assembly can be prepared by winding the separators, negative electrode, and positive electrode together so that the cathode collector protrudes from one end of the assembly while the anode collector extends from the other end of the assembly.

Suitable electrolytes for use in the cells of this invention can be aqueous or nonaqueous. Nonaqueous electrolytes can employ organic or inorganic solvents containing a conductive solute. Suitable solvents include tetrahydrofuran (THF), dioxolane, dimethoxyethane (DME), dimethyl isozazole (DMI), 3-methyl-2-oxazolidone, diethyl carbonate (DEC), propylene carbonate, ethylene glycol sulfite (EGS), dioxane, dimethyl sulfite (DMS), or the like and mixtures thereof.

Suitable salts include: $MCF_3SO_3$, $MSCN$, $MBF_4$, $MClO_4$ and $MM'F_6$ wherein M is lithium, sodium or potassium, and M' is phosphorus, arsenic or antimony. The particular salt selected is compatible and non-reactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. Examples of a preferred electrolyte are a mixture of dioxolane, propylene carbonate, and dimethoxyethane, and $LiClO_4$.

The housing of the cells of this invention is comprised of an electrically conductive metal. It contains a means for providing a terminal for one of the electrodes. Preferably, the housing has an open end and a closed end and is cylindrical. This configuration is preferred because the housing itself can contact one of the electrodes to provide a terminal.

The cover assembly also contains a means for providing the terminal opposite in polarity from the terminal provided by the housing. Preferably, the cover assembly further comprises a seal-vent assembly which provides a means for sealing and insulating the cover assembly from the cell housing, and a means for venting the cell.

Examples of suitable venting means in the seal-vent assembly include providing an orifice in the assembly to provide a path from the interior of the cell to the exterior of the cell. This orifice can then be closed with a sealing plug which will melt at a temperature or will be expelled at a pressure suitable to allow the internal components of the cell to escape. Another suitable venting means is coining or etching a design in the assembly to provide weakened areas which could be blown out under increased cell pressure. A preferred vent means has a seal-vent assembly having a venting well providing a means for venting the cell. Such a means is preferably provided by employing a vent orifice in the bottom of the venting well and inserting a vent sealing member in the venting well over the orifice. Such a desirable vent means is disclosed in U.S. patent Appl. Ser. No. 886,619 now abandoned which is herein incorporated in its entirety by reference.

In a preferred embodiment the cells are assembled by forming the electrode assembly and inserting the assembly into a housing having a closed end and an open end, so that one of the electrodes is in contact with the housing. After placing the electrodes assembly in the cell, the electrolyte is added and the cover assembly is placed over the open end of the housing.

The current collector-safety switch member can be placed in the cell circuit in any manner which will allow the legs to retract to disconnect the cell circuit. Preferably, the current collector-safety switch is in physical contact with one of the electrodes and is in electrical contact with the terminal. Of course, the current collector-safety switch can also be in direct physical contact with the terminal. For example, the current collector-safety switch member can advantageously be inserted with the base portion in contact with the closed end of the cell housing and the legs extending up toward the open end of the cell housing. When the electrode assembly is inserted into the cell housing, the extended current collectors on the electrode assembly will provide a direct physical pressure contact with the extended legs of the current collector-safety switch member. In such an embodiment, a means for holding the electrode assembly is preferably provided in the cell so that when the legs of the current collector-safety switch retract, the electrode assembly is held in place and out of contact with the electrode assembly.

In another preferred embodiment, the current collector-safety switch member can be inserted into the cell housing with the legs in contact with the housing. The electrode assembly will then physically contact the base portion and once again must be held so that when the legs retract the electrical circuit between the electrode assembly and collector-switch member will be disconnected.

In a preferred embodiment of the cell, the current collector-safety switch has an orifice in the base portion for attaching to a cell component, such as the venting well in the seal-vent assembly. The current collector-safety switch can thereby be attached to the venting well in an interference or snap fit. If the base portion of the current collector-safety switch is contacting the anode or cathode collector portion of the electrode assembly and the legs of the member are in contact with the seal-vent assembly, an electrical insulating sleeve around the vent well is preferably used to prevent the current collector-safety switch from tilting and reconnecting the circuit after the legs have retracted. Advantageously, the insulating sleeve is provided with an interference fit around the vent well, and the current collector-safety switch is preferably snap fitted onto the insulating sleeve.

In another preferred embodiment the current collector-safety switch with the orifice in the base portion can be fitted directly onto the venting well with the legs extending down to contact the anode or cathode collector portion of the electrode assembly. This embodiment is not as preferred as the embodiment using the insulating sleeve because the legs of the current collector-safety switch can possibly cause damage to the anode or cathode collector portion.

Referring now to the drawings, in FIG. 1, an electrochemical cell 10 is shown having a spirally wound electrode assembly 15 of a lithium anode 20 and an iron disulfide cathode 25. A current collector-safety switch member 30 is shown having a base portion 32 in contact with the cathode collector 34 of the electrode assembly 15. The leg 35 of the current collector-safety switch member 30 extends up and contacts the seal-vent assembly 40 of the cover assembly 45. The collector-safety switch member 30 has orifice 38 to provide a snap fit onto an insulating sleeve 50 which insulates the collector-safety switch member 30 from the vent well 47 of the seal-vent assembly 40. A vent sealing member 49 is employed in the venting well 47.

The cell is assembled by placing the electrode assembly 15 into the conductive housing 12. An insulating cone 55 is than placed on top of the electrode assembly, then a ring-support member 57 is placed on the cone 55 above a bead 59 in the cell housing 12. An insulating gasket 60 is employed around the seal-vent assembly 40 to provide a fluid- and gas-tight seal. A resettable PTC switch disc 62 is placed above the seal-vent assembly 40 and is in contact with a conductive washer 64. A terminal member 66 is then placed on top of the conductive washer 64 to complete the cover assembly 45.

Figure 2:
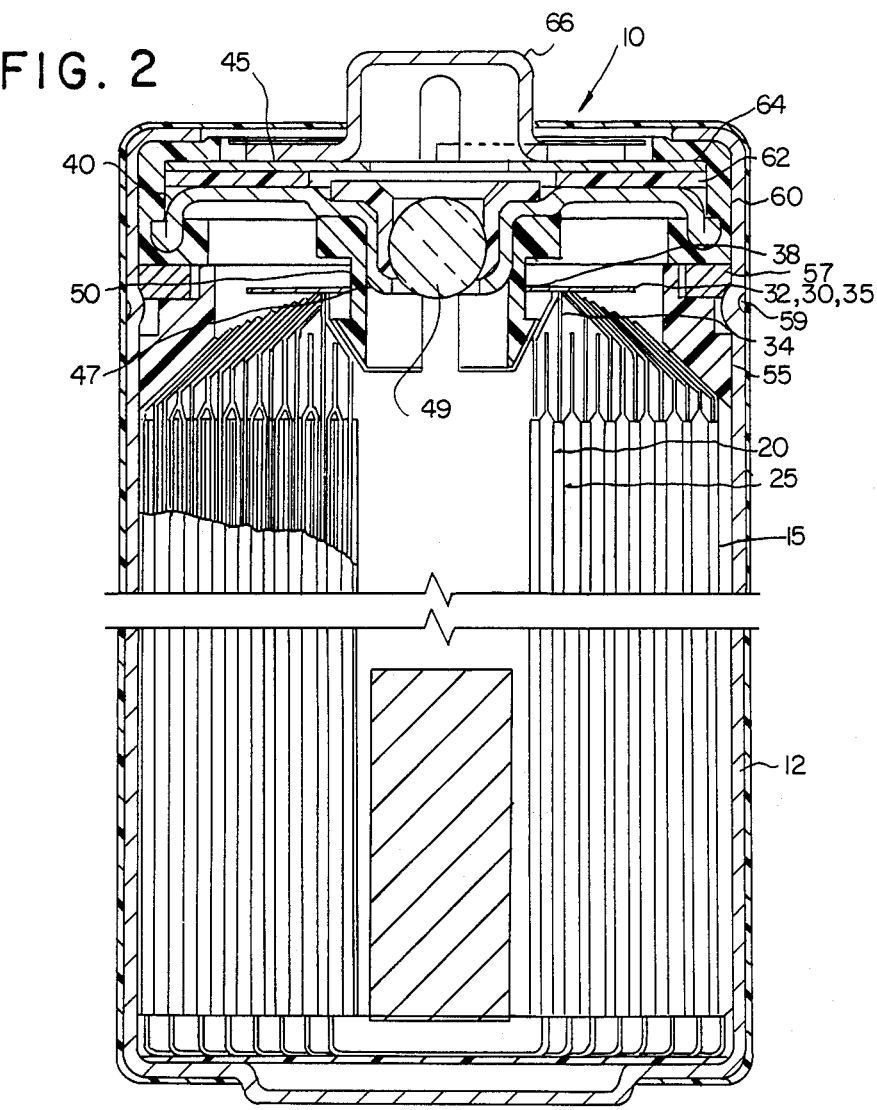
FIG. 2 depicts the electrochemical cell of FIG. 1 after the legs of the current collector-safety switch member have retracted.

In FIG. 2, a cell subjected to abuse conditions has the legs 35 of the current collector-safety switch member 30 retracted to be flush with base portion 32. The legs 35 are no longer in contact wih the seal-vent assembly 40, and consequently the electrical connection between the cathode collector 34 and cover assembly 45 has been broken.

Figure 3:
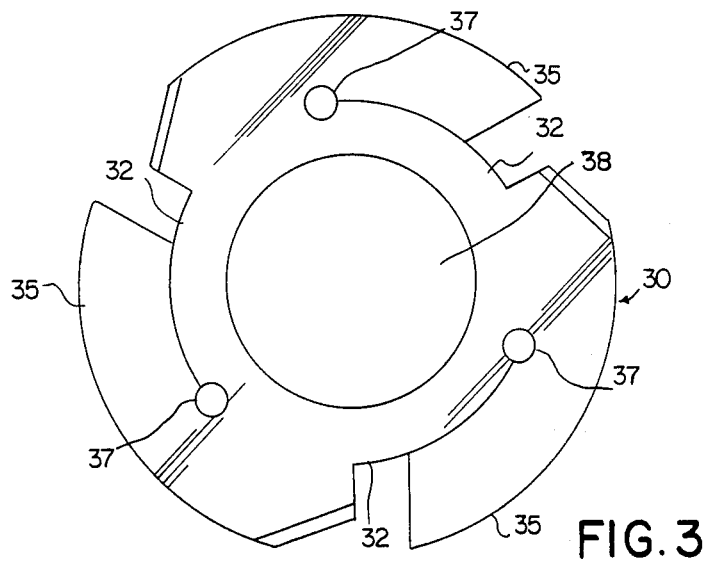
FIG. 3 depicts one embodiment of the current collector-safety switch member employed in the cells of this invention.

In FIG. 3, a current collector-safety switch member 30 is shown. The member 30 has base portion 32 and three extending legs 35. The member also has three stress-relief openings 37. When forming the extending legs 35, care should be taken so that any burrs formed will be in a direction, which when the legs 35 begin to retract, which will not substantially interfere with each other to inhibit retraction of legs 35. The current collector-safety switch member 30 also has orifice 38 so that it can be fit onto the venting well 47 and insulating sleeve 50.

The electrochemical cells of this invention have highly reliable safety switch means which effectively disconnect the electrochemical cell circuit at a safe temperature. The cell circuit is preferably interrupted prior to the venting of the cell or rupture of the cell container. Moreover, the cells of this invention which employ both the current collector-safety switch and PTC thermal switch can be employed in a multicell device, and the circuit will be interrupted even if abuse conditions are experienced at the above breakdown voltage of the PTC thermal switch.

What is claimed:

1. An electrochemical cell comprising:
   (a) an electrode assembly containing a positive and negative electrode;
   (b) a housing containing the electrode assembly, and containing a means for providing a terminal for one of the electrodes;
   (c) a cover assembly containing a means for providing a terminal opposite the terminal of the housing to thereby establish an electrical circuit in the cell; and
   (d) a current collector member disposed in the circuit and in physical contact with one of the electrodes; said collector comprised of a shape-memory alloy, and having a base portion and a plurality of legs extending from the base portion; wherein the collector provides a means for disconnecting the electrical circuit in the cell when the internal temperature of the cell rises.

2. The electrochemical cell of claim 1, wherein the electrode assembly is a stacked electrode assembly.

3. The electrochemical cell of claim 1, wherein the electrode assembly is a plate assembly.

4. The electrochemical cell of claim 1, wherein the current collector member is a spring member providing means for establishing spring bias contact between the electrode and its terminal.

5. The electrochemical cell of claim 4, wherein the base portion of the current collector physically contacts an electrode of the electrode assembly.

6. The electrochemical cell of claim 1, wherein the terminal means of the housing is an electrical contact between one of the electrodes and the housing.

7. The electrochemical cell of claim 6, wherein the housing has a closed end and an open end.

8. The electrochemical cell of claim 7, wherein the current collector member is disposed in the closed end of the cell housing.

9. The electrochemical cell of claim 8, wherein the legs of the current collector member are in contact with the cell housing.

10. The electrochemical cell of claim 7, wherein current collector member is disposed in the open end of the cell housing.

11. The electrochemical cell of claim 10, wherein the base portion of the current collector member is in contact with the cover member.

12. The electrochemical cell of claim 9, wherein the current collector member is a spring member providing means for establishing spring bias contact between the electrode and its terminal.

13. The electrochemical cell of claim 11, wherein the current collector member is a spring member providing means for establishing spring bias contact between the electrode and its terminal.

14. The electrochemical cell of claim 4, wherein the current collector member is a three-legged spring member.

15. The electrochemical cell of claim 1, wherein the legs of the current collector member retract at an internal cell temperature of between about 85° C. and about 95° C.

16. An electrochemical cell comprising
   (a) a spirally wound electrode assembly containing a positive and a negative electrode;
   (b) a conductive cell housing which is closed at one end and open at the other end, and in which the closed end is in electrical contact with one of the electrodes so that the housing is adapted to be one of the cell's terminals;
   (c) a cover assembly, disposed over the open end of the housing, comprising a seal-vent assembly which contains a venting well providing means for venting the cell; the cover assembly further having means for providing a terminal for the electrode opposite the electrode in contact with the housing to thereby establish an electrical circuit in the cell; and
   (d) a current collector member, disposed in the electrical circuit of the cell in physical contact with one of the electrodes and in electrical contact with the terminal, comprised of a shape memory alloy, and having a base portion, a plurality of contact legs extending away from the base portion, and a means for attaching th collector to the venting well, wherein the current collector member provides a means for disconnecting the electrical circuit in the cell when the internal temperature of the cell rises.

17. The electrochemical cell of claim 16, wherein the current collector member is a spring member providing means for establishing spring bias contact between the electrode and its terminal.

18. The electrochemical cell of claim 17, wherein the current collector is a three-legged spring member having the base portion in physical contact with the electrode assembly and the legs in contact with the sealvent asembly.

19. The electrochemical cell of claim 18, wherein the negative electrode is comprised of lithium, and the positive electrode is comprised of $FeS_2$.

20. The electrochemical cell of claim 18, wherein the cover assembly is further comprised of a resettable thermal switch providing means for inhibiting the flow of current in the electrical circuit below the disconnect temperature of the current collector.

21. The electrochemical cell of claim 19, wherein the cover assembly is further comprised of a resettable thermal switch providing means for inhibiting the flow of current in the electrical circuit below the disconnect temperature of the current collector.

22. An electrochemical cell comprising:
   (a) an electrode assembly containing a positive and a negative electrode;
   (b) opposing terminals connected to the electrodes to provide an electrical circuit;
   (c) a current collector member and a resettable thermal switch member disposed within the electrical circuit, wherein the current collector member is comprised of a shape memory alloy to thereby provide a means for disconnecting the electrical circuit in the cell when the internal temperature of the cell rises, and wherein the resettable thermal switch provides a means for inhibiting the current flow in the electrical circuit at a temperature below the disconnect temperature of the current collector.

23. The electrochemical cell of claim 22, further comprising a cylindrical conductive cell housing containing the electrode assembly, and having an open end and a closed end; wherein the closed end is in electrical contact with one of the electrodes.

24. The electrochemical cell of claim 23, wherein the current collector member is disposed in the open end of the cell housing.

25. The electrochemical cell of claim 24, wherein the resettable thermal switch is a positive thermal coefficient resistance device.

26. The electrochemical cell of claim 25, wherein the current collector member is a spring member providing means for establishing spring bias contact between the electrode and its terminal.

27. The electrochemical cell of claim 26, wherein the negative electrode is comprised of lithium, and the positive electrode is comprised of $FeS_2$.

28. The electrochemical cell of claim 23, wherein the resettable thermal switch is disposed in the closed end of the cell housing between the electrode and the cell housing.

29. The electrochemical cell of claim 28, wherein the current collector member is also disposed in the closed end of the cell housing.

* * * * *